United States Patent
Bae et al.

(10) Patent No.: US 9,256,771 B2
(45) Date of Patent: Feb. 9, 2016

(54) SYSTEM FOR SIMULTANEOUSLY IDENTIFYING MASSIVE RFID TAGS USING HF BAND

(71) Applicant: Electronics and Telecommunications Research Institute, Daejeon (KR)

(72) Inventors: Ji Hoon Bae, Daejeon (KR); Kwang Soo Cho, Daejeon (KR); Man Sik Park, Daejeon (KR); Won Kyu Choi, Daejeon (KR); Hoe Sung Yang, Daejeon (KR); Chan-Won Park, Daejeon (KR); Jong-Suk Chae, Daejeon (KR); Cheol Sig Pyo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 169 days.

(21) Appl. No.: 14/057,797

(22) Filed: Oct. 18, 2013

(65) Prior Publication Data

US 2014/0111310 A1     Apr. 24, 2014

(30) Foreign Application Priority Data

Oct. 18, 2012  (KR) .................. 10-2012-0115966

(51) Int. Cl.
*G06K 7/10*        (2006.01)
*H04B 5/00*       (2006.01)
*G06K 19/07*     (2006.01)

(52) U.S. Cl.
CPC ........ *G06K 7/10198* (2013.01); *G06K 7/10138* (2013.01); *G06K 7/10297* (2013.01); *G06K 19/0723* (2013.01); *H04B 5/0062* (2013.01)

(58) Field of Classification Search
CPC ......... G06K 7/0008; G06K 7/10039–7/10198; G06K 7/10009–7/10336; G06K 19/0723–19/0727; H04B 5/0062
See application file for complete search history.

(56) References Cited

U.S. PATENT DOCUMENTS

| | | | |
|---|---|---|---|
| 6,963,270 B1 * | 11/2005 | Gallagher et al. ........... 340/10.2 |
| 7,716,208 B2 | 5/2010 | Smith et al. |
| 7,973,644 B2 | 7/2011 | Tuttle |
| 8,384,523 B1 * | 2/2013 | Rodriquez et al. .......... 340/10.1 |
| 8,410,906 B1 * | 4/2013 | Dacus et al. ................. 340/10.1 |
| 8,421,598 B1 * | 4/2013 | Dacus et al. ................. 340/10.1 |
| 8,773,243 B1 * | 7/2014 | van Niekerk et al. ........ 340/10.3 |
| 2004/0066281 A1 * | 4/2004 | Hughes et al. ............... 340/10.2 |
| 2004/0140884 A1 * | 7/2004 | Gallagher et al. ........... 340/10.2 |
| 2005/0052283 A1 * | 3/2005 | Collins et al. ............... 340/572.7 |
| 2005/0057341 A1 * | 3/2005 | Roesner ..................... 340/10.33 |
| 2006/0049916 A1 * | 3/2006 | Kuriki ......................... 340/10.1 |
| 2006/0261952 A1 * | 11/2006 | Kavounas et al. ......... 340/572.2 |

(Continued)

FOREIGN PATENT DOCUMENTS

KR    10-2011-0028122 A    3/2011

*Primary Examiner* — Hai Phan
*Assistant Examiner* — Orlando Bousono
(74) *Attorney, Agent, or Firm* — Rabin & Berdo, P.C.

(57) ABSTRACT

A tag of an apparatus for simultaneously identifying massive tags according to the present invention may include an analog circuit unit to communicate with a reader through an analog signal and to receive energy via magnetic coupling with the reader. Further, the tag may include a digital circuit unit to be supplied with power from the analog circuit unit. The digital circuit unit may support a sleep mode for the tag to stand by in a low power state after transmitting an identifier (ID) to the reader and a wait mode for controlling random access to the reader.

8 Claims, 14 Drawing Sheets

(56) References Cited

U.S. PATENT DOCUMENTS

| | | | |
|---|---|---|---|
| 2006/0261953 A1* | 11/2006 | Diorio et al. | 340/572.2 |
| 2006/0261954 A1* | 11/2006 | Dietrich et al. | 340/572.2 |
| 2006/0261955 A1* | 11/2006 | Humes et al. | 340/572.2 |
| 2006/0261956 A1* | 11/2006 | Sundstrom et al. | 340/572.2 |
| 2006/0267772 A1* | 11/2006 | Knadle et al. | 340/572.4 |
| 2006/0284727 A1* | 12/2006 | Steinke | 340/10.31 |
| 2006/0289641 A1* | 12/2006 | Roesner | 235/435 |
| 2007/0069864 A1* | 3/2007 | Bae et al. | 340/10.2 |
| 2008/0061943 A1* | 3/2008 | Wu et al. | 340/10.33 |
| 2008/0088473 A1* | 4/2008 | Kim et al. | 340/825.37 |
| 2008/0238679 A1* | 10/2008 | Rofougaran et al. | 340/572.2 |
| 2009/0058604 A1* | 3/2009 | Jung et al. | 340/10.1 |
| 2009/0066516 A1* | 3/2009 | Lazo | 340/572.7 |
| 2009/0231138 A1* | 9/2009 | Lai et al. | 340/572.4 |
| 2010/0060425 A1* | 3/2010 | Rodriguez et al. | 340/10.1 |
| 2010/0060432 A1* | 3/2010 | van Niekerk et al. | 340/10.3 |
| 2010/0123556 A1* | 5/2010 | Rofougaran et al. | 340/10.1 |
| 2010/0148933 A1* | 6/2010 | Dacus | 340/10.3 |
| 2011/0064165 A1* | 3/2011 | Bae et al. | 375/319 |
| 2011/0148585 A1* | 6/2011 | Bae et al. | 340/10.1 |
| 2011/0148599 A1 | 6/2011 | Park et al. | |
| 2012/0007715 A1* | 1/2012 | Rofougaran et al. | 340/10.1 |
| 2012/0056724 A1* | 3/2012 | Fushimi | 340/10.51 |
| 2012/0057656 A1* | 3/2012 | Bae et al. | 375/319 |
| 2012/0133491 A1* | 5/2012 | Yamashita et al. | 340/10.51 |
| 2012/0235799 A1* | 9/2012 | Yamasaki | 340/10.51 |
| 2012/0274451 A1* | 11/2012 | Rofougaran et al. | 340/10.1 |

* cited by examiner

SYSTEM FOR SIMULTANEOUSLY IDENTIFYING MASSIVE RFID TAGS USING HF BAND

CROSS-REFERENCE TO RELATED APPLICATION

This application claims the priority benefit of Korean Patent Application No. 10-2012-0115966, filed on Oct. 18, 2012, in the Korean Intellectual Property Office, the disclosure of which is incorporated herein by reference.

BACKGROUND

1. Field of the Invention

The present invention relates to a passive radio-frequency identification (RFID) system using a high-frequency (HF) band, particularly 13.56 megahertz (MHz), and more particularly, to a system and an apparatus for simultaneously identifying stacked RFID tags and massive RFID tags using an HF band.

2. Description of the Related Art

A passive radio-frequency identification (RFID) system using a high frequency band, particularly 13.56 MHz, includes a tag having object information and a reader.

The tag of the passive RFID system using the HF band receives a carrier wave from the reader via magnetic coupling in a radio environment.

The tag is powered through the received carrier wave and communicates with the reader via load modulation.

Applications of RFID continue to expand from pellet or box level identification to individual item level identification. Recently, ISO/IEC 18000-3 Mode 3 (hereinafter, defined as an HF Gen2 international standard), in which an ultrahigh frequency (UHF) high-performance Gen2 protocol standard is applied to an HF band suitable for metal and liquids, has established.

A conventional amplitude-shift keying (ASK) HF international standard mainly performs one-to-one reader-tag communications. Thus, application of a conventional RFID system is limited to, for example, identification of a small number of tags.

In addition, the conventional technology involves a slow identification speed and limitations in tag identification performance due to an envelope detection method. Thus, in order to overcome theses technical problems, the present invention discloses an HF RFID apparatus and method for simultaneously identifying a plurality of stacked tags at a high speed in accordance with the recent HF Gen2 international standard.

SUMMARY

An aspect of the present invention provides an apparatus for simultaneously identifying a plurality of HF tags that adopts configurations for on/off control of a carrier wave, control of a transmission output level and control of operations of a wait mode and a sleep mode, and employs a subcarrier digital demodulation unit in order to overcome the problems of the conventional technology. Accordingly, the present invention provides an apparatus and method capable of simultaneously identifying a plurality of stacked HF tags at a high speed.

According to an aspect of the present invention, a tag of an apparatus for simultaneously identifying massive HF tags may include an analog circuit unit to communicate with a reader through an analog signal and to receive energy via magnetic coupling with the reader.

The tag may include a digital circuit unit to be supplied with power from the analog circuit unit.

The digital circuit unit may support a sleep mode for the tag to stand by in a low power state after transmitting an identifier (ID) to the reader and a wait mode for controlling random access to the reader.

The analog circuit unit may include a transmission unit to receive an input of an encoded signal from the digital circuit unit and to transmit the encoded signal to the reader via amplitude-shift keying (ASK) modulation using load modulation.

The analog circuit unit may include a rectifier and power supply unit to receive a carrier wave transmitted from the reader and to generate own power.

The analog circuit unit may include an initialization unit to initialize an internal operation of the tag in the wait mode of the tag.

The analog circuit unit may include a reception unit to receive a command transmitted from the reader and to conduct ASK demodulation.

The digital circuit unit may include an encoder to encode a reply message to a reader command.

The digital circuit unit may include a decoder to receive an input of the reader command from the analog circuit unit and to extract information.

The digital circuit unit may include a protocol processing unit to process inventory and access protocols.

The digital circuit unit may include a tag state controller to control the wait mode and the sleep mode to process the inventory and access protocols.

The tag state controller may include a wait mode controller to control an operation in the wait mode and a sleep mode controller to control an operation in the sleep mode.

The tag state controller may include a tag state transition unit to perform the inventory and access protocols in accordance with the HF Gen2 international standard.

The digital circuit unit may a memory to store the ID.

The sleep mode controller may control the tag to transition to the sleep mode when a reader command needed for the inventory protocol is received in an acknowledged mode.

The wait mode controller may control the tag in the sleep mode to transition to the wait mode using a carrier wave.

The sleep mode controller may block supply of power and a clock to all blocks, excluding the rectifier and power source unit and the initialization unit, in the sleep mode.

The wait mode controller may initialize all operations of the tag using a reset signal in the wait mode.

The wait mode controller may control a first random access mode and a second random access mode using an internal parameter and a preset waiting time.

The internal parameter and the preset waiting time may be changed using a reserved reader command.

The wait mode controller may generate a random sequence based on the internal parameter in the first random access mode.

The wait mode controller may select any one random value from the generated random sequence and control the tag to transition to a ready mode after discounting the random value to 0.

The wait mode controller may randomly select one of 0 and 1 with the internal parameter fixed to 1 in the second random access mode.

The wait mode controller may control the tag to transition to a ready mode when 0 is selected as the internal parameter, and reselect one of 0 and 1 after a wait for the preset waiting time when 1 is selected.

The tag in the ready mode may control a tag state so as to transition to the wait mode when the reader command is not received for the preset waiting time or when the reader command is not received even after a plurality of rounds.

According to an aspect of the present invention, a reader of an apparatus for simultaneously identifying massive tags may include an analog circuit unit to adjust a transmission output level and to transmit a reader command in an analog form via amplitude-shift keying (ASK) modulation.

The reader may include an analog-to-digital converter (ADC) to receive the modulated tag signal and to convert the tag signal into a digital signal.

The reader may include a digital circuit unit to receive the digital tag signal.

The digital circuit unit may receive and demodulate the tag signal and control a carrier operation.

The digital circuit unit may include an encoder to encode and transmit the reader command to the analog circuit unit.

The digital circuit unit may include a subcarrier digital demodulator to receive an input of the tag signal received from the ADC to remove a subcarrier.

The digital circuit unit may include a decoder to receive an input of a basis signal with the subcarrier removed to extract tag information.

The digital circuit unit may include a protocol processing unit to process inventory and access protocols.

The digital circuit unit may include a transmission output level controller to control a transmission output level of a power amplifier of the analog circuit unit to switch between at least two transmission output levels.

The digital circuit unit may include a carrier transmission controller to control an operation of a carrier output from a transmission unit of the analog circuit unit.

The subcarrier digital demodulator may include a decimation filter to receive an input of the received tag signal and filter the tag signal.

The subcarrier digital demodulator may include a Miller subcarrier digital demodulator and a Manchester subcarrier digital demodulator to remove a subcarrier from the filtered tag signal.

The subcarrier digital demodulator may include a multiplexer (Mux) to select one of the Miller subcarrier digital demodulator and the Manchester subcarrier digital demodulator.

The Miller subcarrier digital demodulator may include a peak signal generator to generate a peak signal from the tag signal.

The Miller subcarrier digital demodulator may include a peak extractor to extract a peak from the peak signal.

The Miller subcarrier digital demodulator may include a basis signal generator to generate the basis signal with the subcarrier removed from the extracted peak signal.

The transmission output level controller may output a control signal of the power amplifier of the analog circuit unit to adjust the transmission output level.

The transmission output level controller may control the transmission output level, iteratively alternately switching from a maximum level to a minimum level, and back to the maximum level in each round of a phase.

According to an aspect of the present invention, an operation method of a tag in a system for simultaneously identifying massive RFID tags using an HF band may include receiving a carrier wave from a reader and waiting in a ready mode.

The operation method may include transitioning to an arbitrate mode and selecting one of a plurality of slots set by the reader when a BeginRound command is received in the ready mode.

The operation method may include transitioning to a reply mode simultaneously with transmitting a stored Cyclic Redundancy Checking (CRC) packet using the selected slot.

An internal parameter and a preset waiting time of the ready mode may be determined on a reader command received from the reader.

According to an aspect of the present invention, an operation method of a reader in a system for simultaneously identifying massive RFID tags using an HF band may include amplitude-shift keying (ASK) demodulating a received tag signal.

The operation method may include converting an analog signal into a digital signal for digital demodulation of the tag signal.

The operation method may include demodulating a subcarrier of the tag signal converted into the digital signal.

The operation method may include decoding the demodulated tag signal to extract information.

In the operation method, massive tag identification performance is improved by the ASK demodulating into the analog signal and the demodulating of the subcarrier into the digital signal.

The demodulating of the subcarrier of the converted tag signal may include Miller subcarrier digital demodulation.

The miller subcarrier digital demodulation may include generating a peak signal from the tag signal.

The miller subcarrier digital demodulation may include extracting position information on the peak signal.

The miller subcarrier digital demodulation may include generating a basis signal using the position information on the peak signal.

The operation method may further include transmitting a reader command to a tag.

The reader command may include an R setting field to set an internal parameter for controlling a random access mode of the tag.

The reader command may include a Twait setting field to set a preset waiting time for transition to a ready mode based on the internal parameter.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
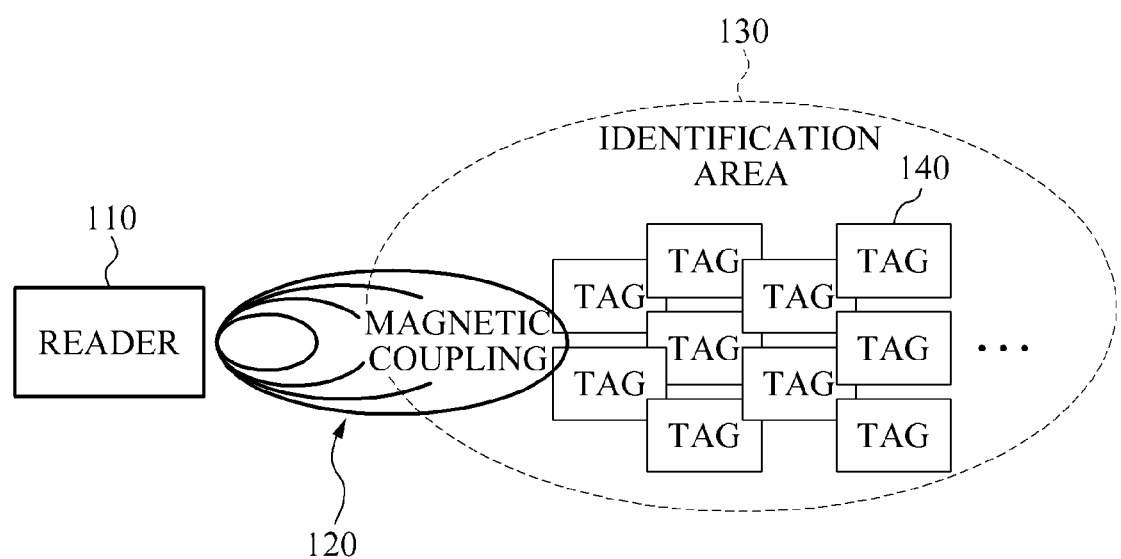
FIG. 1 illustrates a structure of a high-frequency (HF) system according to the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates a structure of a high-frequency (HF) system according to the present invention.

The system for simultaneously identifying massive radio-frequency identification (RFID) tags using an HF band according to the present invention may include one reader 110 and a plurality of HF tags 140. Reader-tag communications are realized by magnetic coupling 120. The reader 110 may identify the plurality of tags 140 located within an identification area 130 to stack the tags and simultaneously identify the tags at a high speed via magnetic coupling 120.

The tags 140 may support a sleep mode in which the tags 140 stand by in a low power state and a wait mode for controlling random access to the reader. That is, operation states of the tags 140 include the sleep mode and the wait mode.

Figure 2:
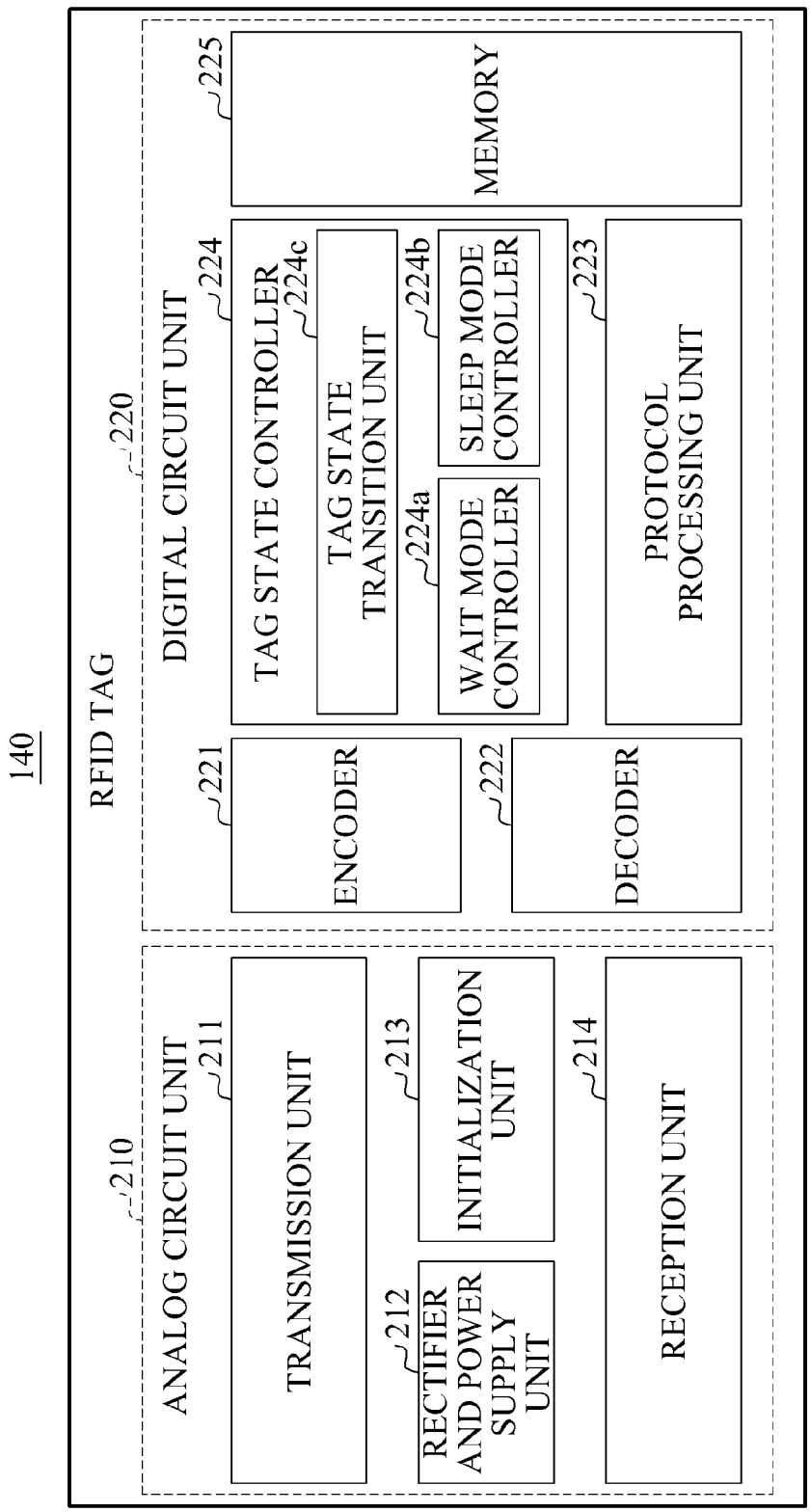
FIG. 2 illustrates a structure of a tag according to an exemplary embodiment of the present invention.

FIG. 2 illustrates a structure of a tag according to an exemplary embodiment of the present invention.

As shown in FIG. 2, the HF tag 140 according to the present embodiment may generally include an analog circuit unit 210 and a digital circuit unit 220.

The analog circuit unit 210 of the tag 140 may receive an input of an encoded signal from the digital circuit unit 220. Further, the analog circuit unit 210 may communicate with a reader through an analog signal and receive energy via magnetic coupling with the reader.

The digital circuit unit 220 may support a sleep mode for the tag 140 to stand by in a low power state after transmitting an identifier (ID) to the reader and a wait mode for controlling random access to the reader.

The analog circuit unit 210 may include a transmission unit 211, a rectifier and power supply unit 212, an initialization unit 213, and a reception unit 214.

The transmission unit 211 may conduct amplitude-shift keying (ASK) modulation of the input signal using load modulation and transmit the signal to the reader.

The rectifier and power supply unit 212 may receive a carrier wave transmitted from the reader and generate own power.

The initialization unit 213 may generate a reset signal and initialize an internal operation of the tag.

The reception unit 214 may receive a command transmitted from the reader to conduct ASK demodulation.

The digital circuit unit 220 of the tag 140 may be supplied with power from the analog circuit unit 210.

The digital circuit unit 220 of the tag 140 may include an encoder 221, a decoder 222, a protocol processing unit 223, a tag state controller 224, and a memory 225.

The encoder 221 may encode a reply message corresponding to a reader command and transmit the reply message to the transmission unit 211 of the analog circuit unit 210.

The decoder 222 may receive a reader command from the reception unit 214 of the analog circuit unit 210 to extract tag information.

The protocol processing unit 223 may process inventory and access protocols in accordance with an HF Gen 2 international standard. The inventory protocol is a reader-tag communication protocol which includes reader commands of Select, BeginRound, NextSlot, or the like for the reader to obtain a tag ID and tag responses to the reader commands including the tag ID. Meanwhile, the access protocol is a reader-tag communication protocol for the reader to read or write a user desired data in a user memory of the tag.

The tag state controller 224 may include a wait mode controller 224a and a sleep mode controller 224b to perform massive identification and a tag state transition unit 224c to perform the inventory and access protocols in accordance with the HF Gen 2 international standard.

The memory 225 may store the ID of the tag.

Hereinafter, operations of components of the HF tag for massive identification will be described in detail with reference to the tag state controller 224 including the wait mode controller 224a, the sleep mode controller 224b, and the tag state transition unit 224c of FIG. 2.

Figure 3:
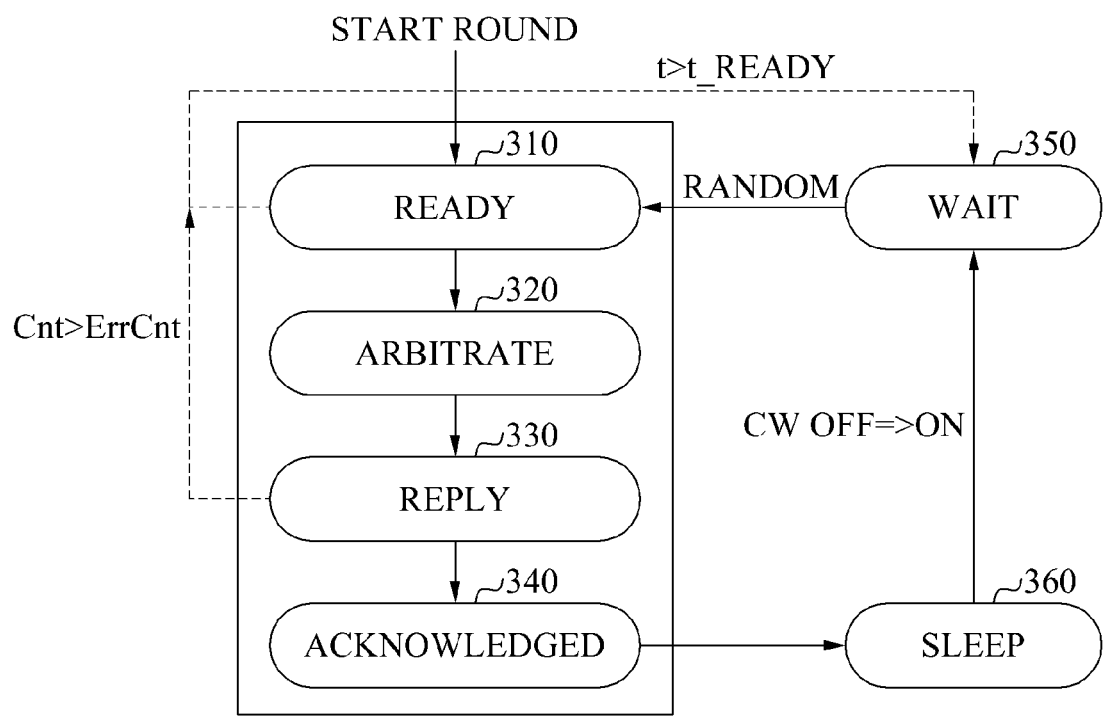
FIG. 3 is a diagram illustrating a state of the tag operated by a tag state controller to conduct communications with a reader.

FIG. 3 is a diagram illustrating a state of the tag operated by the tag state controller 224 to conduct communications with the reader.

A ready mode 310, an arbitrate mode 320, a reply mode 330, and an acknowledged mode 340 of FIG. 3 confirm to the HF Gen2 international standard.

The aforementioned modes may be basic state modes that the tag conduct so as to transmit the ID of the tag to the reader in the inventory protocol with the reader.

That is, according to the conventional HF Gen2 international standard, the tag may receive a carrier wave from the reader to generate own power and stand by in the ready mode 310. When BeginRound among the reader commands to conduct the inventory protocol with the reader is received in the ready mode 310, the tag may transition to the arbitrate mode 320.

In the arbitrate mode 320, the tag may select one of a plurality of slots set by the reader. The tag may transition to the reply mode 330 simultaneously with transmitting a stored Cyclic Redundancy Checking (CRC) packet to the reader using the selected slot.

When an Acknowledged reader command including Stored CRC the same as Stored CRC transmitted in the previous arbitrate mode 320 is received in the reply mode 330, the tag transmits the ID of the tag to the reader and transitions to the acknowledged mode 340 at the same time. If the tag in the reply mode 330 receives an Acknowledged reader command including Stored CRC which is different from Stored CRC transmitted in the previous arbitrate mode 320 or does not receive an Acknowledged reader command, the tag transitions to the arbitrate mode 320 and waits for a next round.

Meanwhile, when the reader sends a NextSlot command to communicate with another tag in a next slot, the tag in the acknowledged mode 340 may transition back to the ready mode 310 and wait. The reader may obtain IDs of tags by repeating such a series of processes.

Here, a round may include a time period for which the BeginRound reader command is transmitted and be formed of time periods for a series of reader commands needed to obtain tag IDs and tag responses to the commands.

In one exemplary embodiment, identification of massive tags may be achieved in an HF band through the wait mode 350 and the sleep mode 360. Unlike in a far-field UHF RFID system radiating electromagnetic waves, a plurality of tags may be concentrated in an identification are in a near-field HF system communicating via magnetic coupling.

Thus, a tag signal intensity may be remarkably reduced due to inter-tag magnetic coupling interference in a radio-wave environment. Moreover, generation of current by an magnetic field through an antenna may be interrupted, so that other tags may not generate own power.

To overcome the foregoing problems and to simultaneously identify a plurality of tags concentrated in a near field enabling communication via magnetic coupling, a tag may conform to an anti-collision protocol on software. Further, the tag may operate with low power on hardware and minimize inter-tag magnetic coupling interference in the radio-wave environment.

According to a conventional technology, when a tag receives other reader commands than the acknowledged reader command after transmitting its own ID to the reader, the tag may transition to the ready mode 310. However, in the present invention, as shown in FIG. 3, the tag may transition from the acknowledged mode 340 to the sleep mode 360.

In the present invention, when the tag transitions to the sleep mode 360, the sleep mode controller 224b of FIG. 2 may generate control signals to block supply of power and a clock to all blocks, excluding the rectifier and power unit 212 and the initialization unit 213.

The tag may transmit the own ID to the reader and stand by with low power using the generated control signals.

Meanwhile, the reader may communicate again with tags standing by in the sleep mode 360. When the reader switches off a carrier wave and switches on again, the tag may transition from the sleep mode 360 to the wait mode 350. Here, when the tag transitions to the wait mode 350, the initialization unit of FIG. 2 may generate a reset signal to initialize all operations of the tag.

The wait mode controller 224a of FIG. 2 may operate with low power in the wait mode 350.

The wait mode controller 224a serves to get random access to participation in the inventory with the reader so as to minimize inter-tag magnetic coupling interference in the radio-wave environment as described above. That is, in order to transition from the wait mode 350 to the ready mode 310, the tag may operate in a first random access mode 400 and a second random access mode 500. The first random access mode 400 and the second random access mode 500 will be described in detail in FIGS. 4 and 5.

As shown in FIG. 3, the tag state controller 224 may control the tag to transition back to the wait mode 350 when reader commands including Select, BeginRound, and NextSlot needed for the inventory protocol are not received for a preset period of time t_ready in the ready mode 310. Meanwhile, before performing a normal round including the foregoing reader commands, a random access mode, an internal parameter R, and a preset waiting time Twait may be defined in advance in the ready mode 310. The random access mode, the internal parameter R, and the preset waiting time Twait may be changed using separately reserved reader commands.

As shown in FIG. 3, the tag state controller 224 may control the tag to transition to the wait mode 350 when the tag in the reply mode 330 does not receive a valid Acknowledged reader command even after a plurality of rounds. That is, when the tag does not receive a valid Acknowledged reader command in each round, the tag state controller 224 may increase and store an error count. When the stored error count is a preset ErrCnt or more, tag state controller 224 may control the tag to transition to the wait mode 350 to minimize inter-tag interference.

Figure 4:
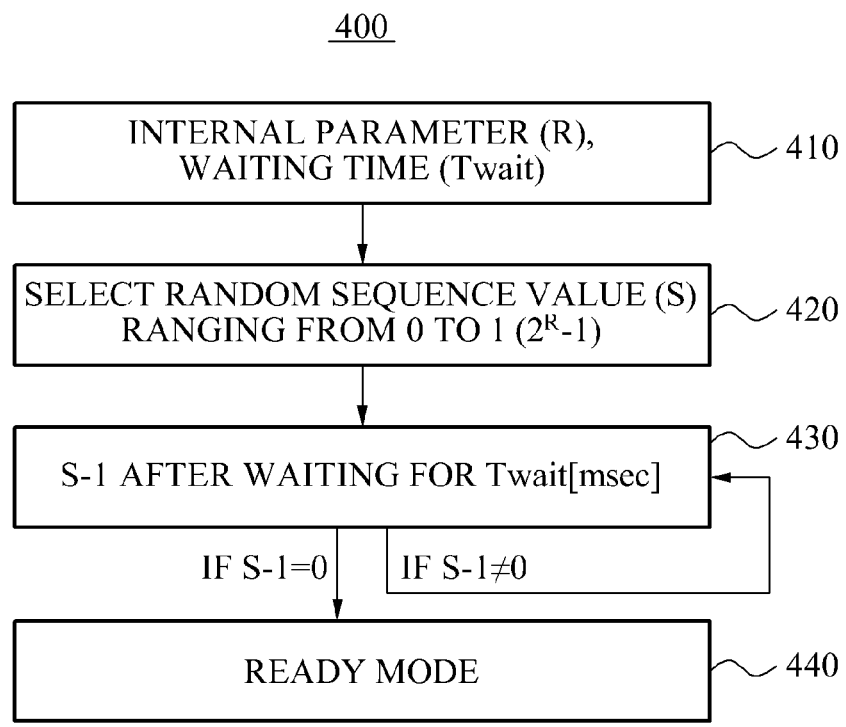
FIG. 4 illustrates the a random access mode for transition from a wait mode to a ready mode.

FIG. 4 illustrates the first random access mode 400 for transition from the wait mode 350 to the ready mode 310.

The internal parameter R and the preset waiting time Twait may be set through a WaitSet reader command in the wait mode.

The tag may randomly transition to the ready mode 310 at a different delay time using the internal parameter R in operation 410. That is, the wait mode controller 224a may generate a sequence of random values ranging from 0 to $(2^R-1)$ depending on the internal parameter R. The wait mode controller 224a may select one value S from the sequence of random values ranging from 0 to $(2^R-1)$ in operation 420.

The tag may wait by the selected value S in the wait mode in operation 430. That is, the wait mode controller 224a waits until the selected value S is discounted to 0. If 0 is selected for the random value S in a first try, the tag may transition immediately to the ready mode 310. When the selected value S is not 0, the wait mode controller 224a waits for the preset waiting time Twait (msec) and then reduce the selected value S by 1.

When the selected value S becomes 0 by repeating this process, the wait mode controller 224a may control the tag to transition from the wait mode to the ready mode. Here, when the tag transitions to the ready mode as the value S is 0, the wait mode controller 224a may provide power and a clock to all blocks in the tag. Thus, the wait mode controller 224a may output relevant control signals to conduct normal inventory communications with the reader.

Meanwhile, the internal parameter R and the preset waiting time Twait may function as predefined initial values. Further, the internal parameter R and the preset waiting time Twait may be changed using reserved reader commands defined in the HF Gen2 international standard in conducting communications with the reader in the ready mode.

In one exemplary embodiment, the tag in the acknowledged mode 340 may transition to the sleep mode 360 in which the tag waits in a low power state, instead of transition to the ready mode 310. Further, the tag in the sleep mode 360 may not immediately transition to the ready mode 310 but pass through the wait mode 350 and conduct communications with the reader for random delay time, thereby minimizing inter-tag magnetic coupling interference in the radio-wave environment.

Figure 5:
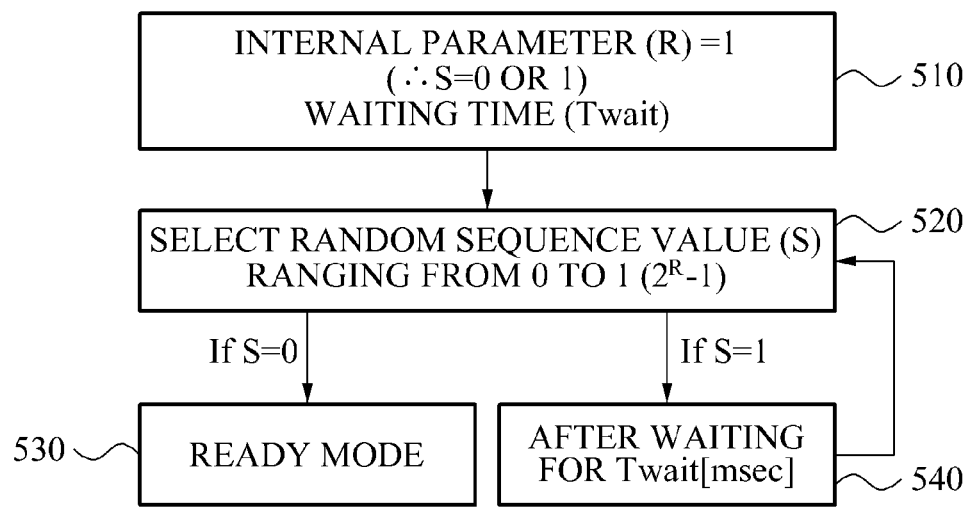
FIG. 5 illustrates a second random access mode for transition from the wait mode to the ready mode.

FIG. 5 illustrates the second random access mode 500 for transition from the wait mode 350 to the ready mode 310.

The aforementioned first random access mode 400 is useful for a case where a plurality of tags is present in the reader identification area, while the second random access mode 500 may be used when a relatively small number of tags are present.

In the wait mode 350, an internal parameter R and a preset waiting time Twait may be set. In the second random access mode 500, the internal parameter R may be fixed to 1 in operation 510. That is, while fixing the internal parameter R to 1, the wait mode controller 224a may select either 0 or 1 as a random sequence value S in operation 520.

When the random sequence value S is 0, the tag may transition directly to the ready mode in operation 530. When the random sequence value S is 1, the tag waits for the preset waiting time Twait (msec) and selects one of 0 and 1 in operation 540.

Only the tag that selects 0 by repeating such a process transitions to the ready mode, thereby minimizing inter-tag magnetic coupling interference in the radio-wave environment. Here, the tag having transitioned to the ready mode may receive a reader command, such as Select and BeginRound, as described in the conventional HF Gen2 standard, and participate in each round to conduct inventory communications with the reader.

Meanwhile, the foregoing random access modes from the wait mode to the ready mode may operate as a predefined initial mode. One of the two random access modes may be selected or changed using a reserved reader command defined in the HF Gen 2 international standard in conducting communications with the reader in the ready mode.

Figure 6:
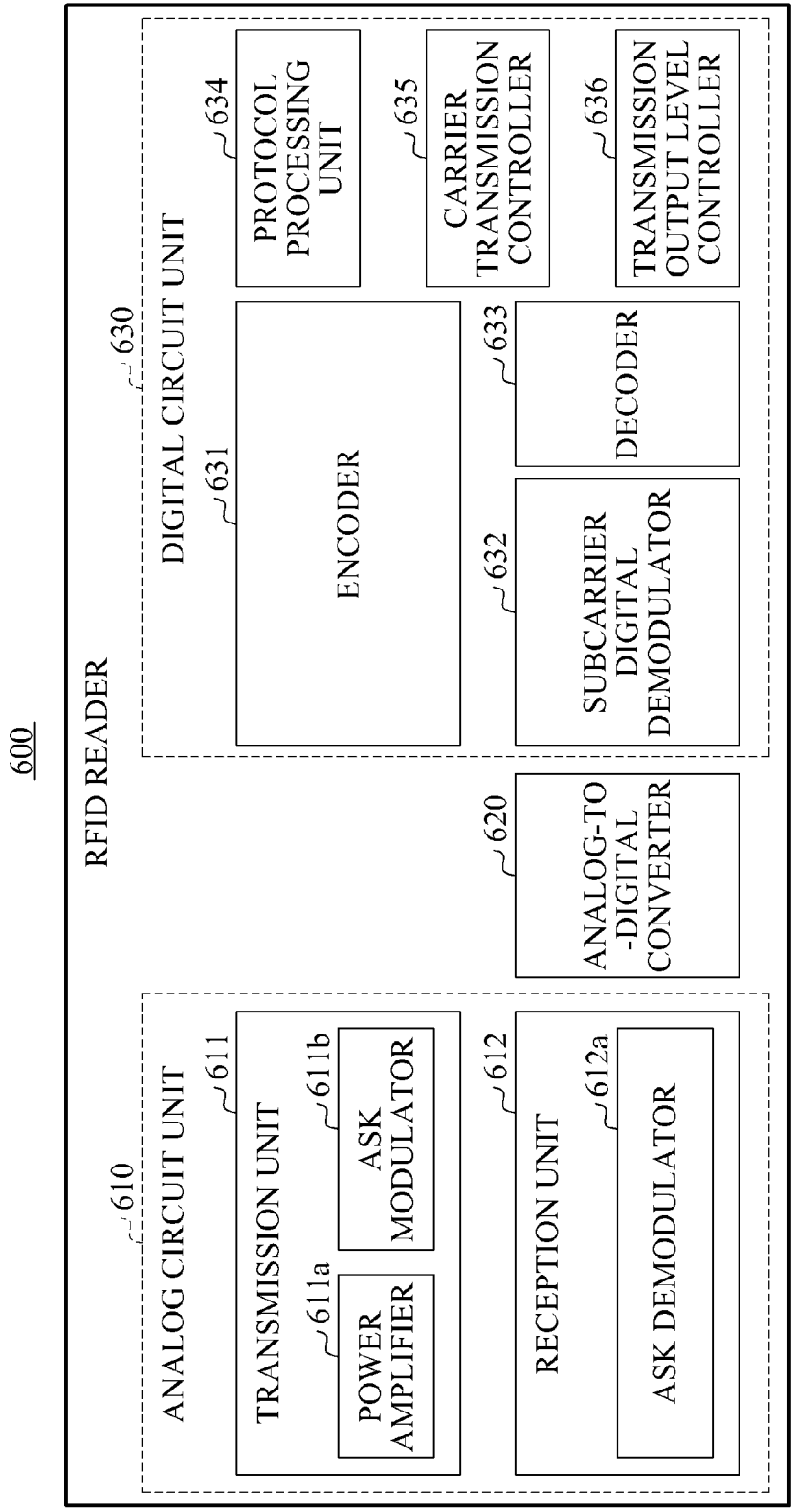
FIG. 6 illustrates a structure of a reader for identifying massive HF tags according to an exemplary embodiment of the present invention.

FIG. 6 illustrates a structure of a reader 600 for identifying massive HF tags according to an exemplary embodiment of the present invention.

The reader 600 may include an analog circuit unit 610, an analog-to-digital converter (ADC) 620 to convert an analog signal to a digital signal, and a digital circuit unit 630.

The analog circuit unit 610 may receive a tag signal, conduct ASK modulation of a reader command and transmit the command in an analog form.

The ADC 620 may receive the tag signal in the analog form and convert the tag signal into a digital signal.

The digital circuit 630 may adjust a plurality of transmission output levels and perform simultaneous identification of massive RFID tags.

The analog circuit unit 610 of the reader 600 may include a transmission unit 611 and a reception unit 612.

The transmission unit 611 may include a power amplifier 611a to adjust a transmission output level and an ASK modulator 611b to conduct ASK modulation of the reader command.

The reception unit 612 may receive a tag signal and conduct ASK demodulation to remove a carrier of the tag signal through an ASK demodulator.

The ADC 620 of the reader 600 may receive the analog tag signal with the carrier removed through ASK demodulation, convert the analog tag signal into a digital signal, and output the digital signal to the digital circuit unit 630.

The digital circuit unit 630 of the reader 600 may include an encoder 631, a subcarrier digital demodulator 632, a decoder 633, a protocol processing unit 634, a carrier transmission controller 635, and a transmission output level controller 636.

The encoder 631 may encode and transmit the reader command to the analog circuit unit 610.

The subcarrier digital demodulator 632 may receive an input of the tag signal with the carrier removed in the ADC 620 through ASK demodulation. The tag signal may be used to generate Miller and Manchester basis signals defined in the HF Gen2 standard by removing a subcarrier from Miller and Manchester subcarrier signals.

The decoder 633 may receive an input of the subcarrier-removed basis signals to extract tag information.

The protocol processing unit 634 may process an anti-collision algorithm and inventory/access protocols specified in the HF Gen2 standard.

The carrier transmission controller 635 may control ON/OFF operations of a carrier wave output from the transmission unit 611 of the analog circuit unit 610.

The transmission output level controller 636 may control a transmission output level of the power amplifier 611a of the analog circuit unit 610.

Hereinafter, operations of the components of the reader 600 for identifying the massive HF tags according to the present embodiment will be described in detail with reference to FIG. 6.

As described above, in the near-field HF band to conduct communication via magnetic coupling, a plurality of tags may be concentrated. Thus, the tag signal may involve undesired noises and the intensity thereof may be remarkably reduced due to inter-tag magnetic coupling interference in the radio-wave environment. Moreover, when the received tag information is demodulated in the reader including both the transmission unit and the reception unit, demodulation performance may be considerably deteriorated by DC-offset noises, thus causing decrease in massive tag identification performance.

Conventional ASK-mode HF RFID reader technology performs ASK demodulation and decoding via simple envelope detection. However, the reader reception method for massive tag identification according to the present invention may include an ASK demodulator 612a to remove a carrier, the subcarrier digital demodulator 632 to remove a sub-carrier via the ADC 620, and the decoder 633 to decode a subcarrier removed basis signal to extract information and transmit the signal to the protocol processing unit 634.

Further, the subcarrier digital demodulator 632 may generate a peak signal using a matching filter and remove DC-offset noises included in a tag reception signal as well.

Figure 7:
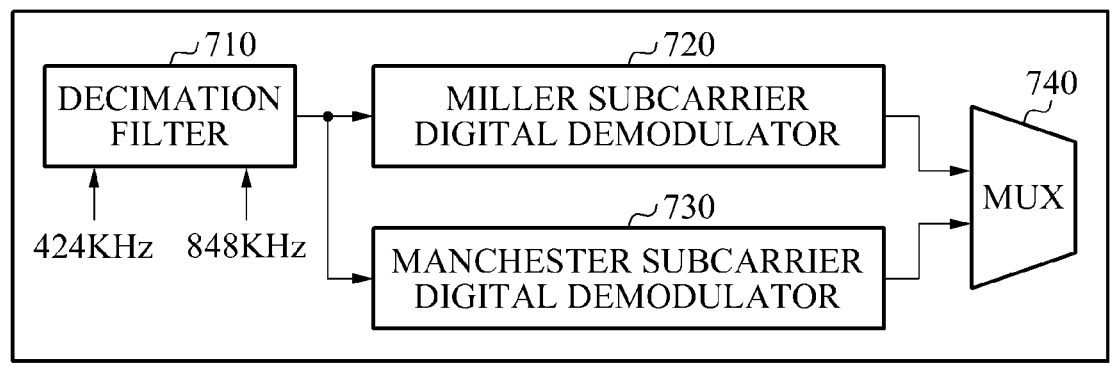
FIG. 7 illustrates a configuration of a subcarrier digital demodulator according to an exemplary embodiment of the present invention.

FIG. 7 illustrates a configuration of the subcarrier digital demodulator 632 according to an exemplary embodiment of the present invention.

The subcarrier digital demodulator 632 may include a decimation filter 710, a Miller subcarrier digital demodulator 720, a Manchester subcarrier digital demodulator 730, and a multiplexer (Mux) 740.

The decimation filter 710 may receive an input of a tag signal received from the ADC 620. The input tag signal may be subjected to filtering, limiting a band depending on sub-carrier frequencies of 424 KHz and 848 KHz.

The Miller subcarrier digital demodulator 720 and the Manchester subcarrier digital demodulator 730 may receive an input of the tag signal from the decimation filter 710 and remove a subcarrier. Accordingly, Miller and Manchester basis signals defined in the HF Gen2 standard may be generated from Miller and Manchester subcarrier signals.

The Mux 740 may select one of the Miller subcarrier digital demodulator 720 and the Manchester subcarrier digital demodulator 730.

Figure 8:
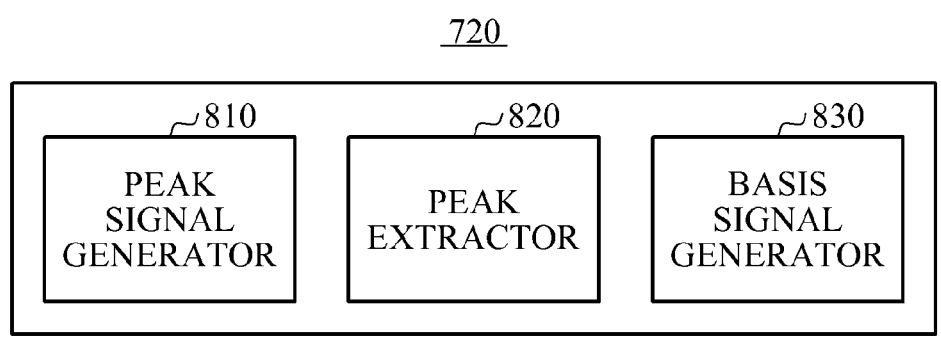
FIG. 8 illustrates a structure of a Miller subcarrier digital demodulator according to an exemplary embodiment of the present invention.

FIG. 8 illustrates a structure of the Miller subcarrier digital demodulator 720 according to an exemplary embodiment of the present invention.

The Miller subcarrier digital demodulator 720 may include a peak signal generator 810, a peak extractor 820, and a basis signal generator 830.

Figure 13:
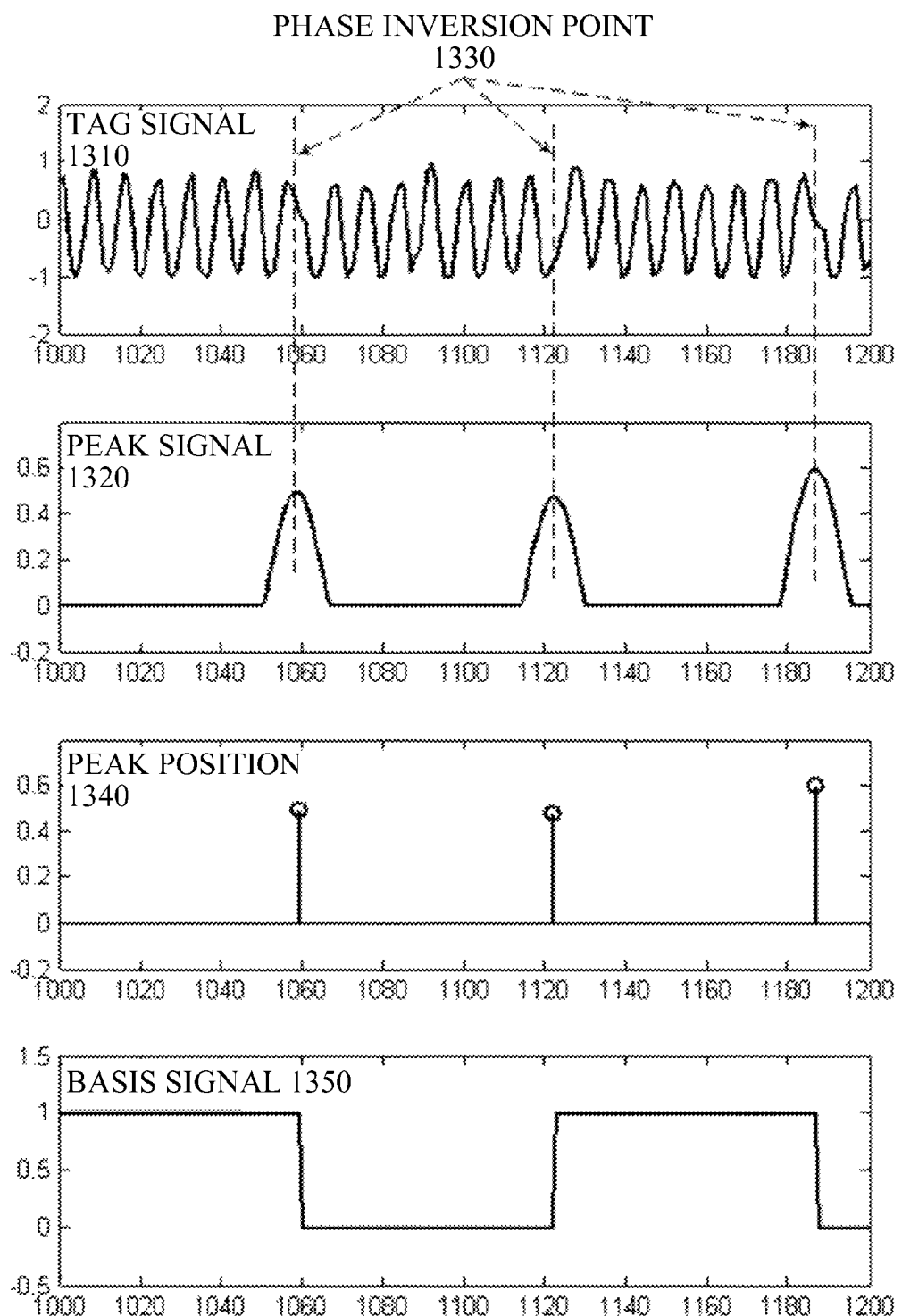
FIG. 13 illustrates a process of generating a peak signal using a peak signal generator when tag signal intensity is higher than a preset level.
Figure 14:
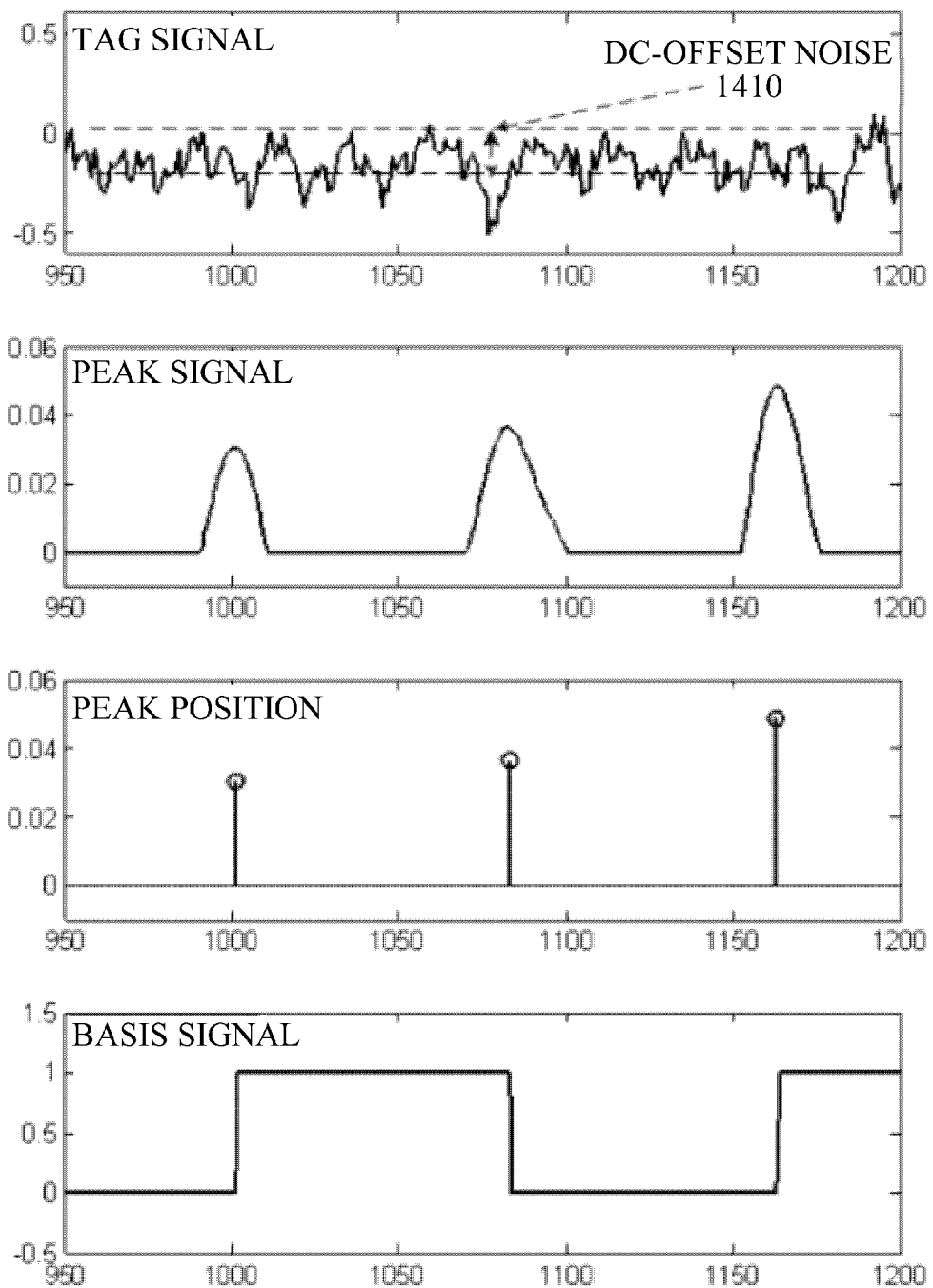
FIG. 14 illustrates a process of generating a peak signal using a peak signal generator when tag signal intensity is lower than a preset level.

The peak signal generator 810 may generate a peak signal 1320 from a tag signal 1310 output from the ADC 620. A process of generating the peak signal using the peak signal generator 810 will be illustrated with reference to FIGS. 13 and 14.

Figure 9:
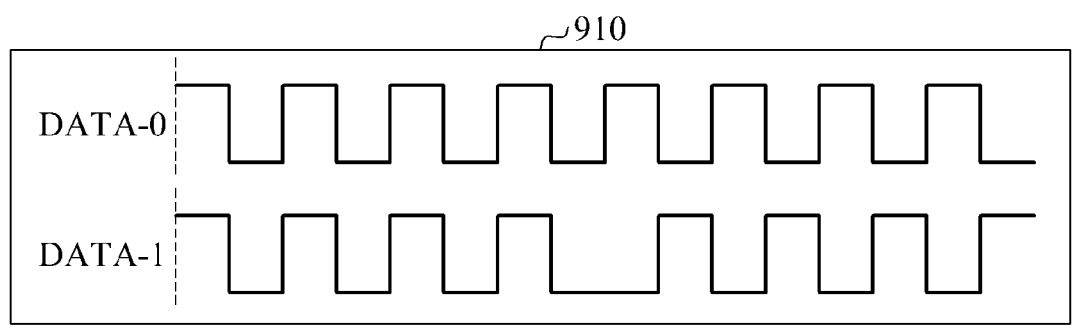
FIG. 9 illustrates two types of data for generating a peak signal.
Figure 9:
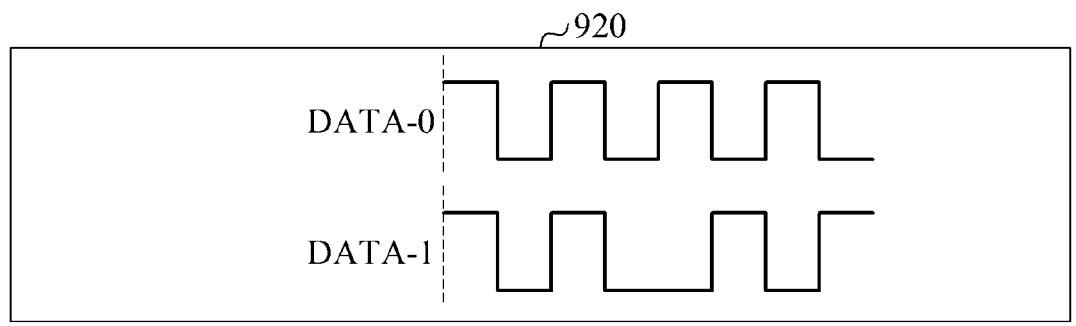

The peak signal generator 810 may generate the peak signal 1320 using matching filters corresponding to data Data-0 and Data-1 shown in FIG. 9. The peak signal generator 810 may select one of two forms 910 and 920 of FIG. 9. According to the present embodiment, the output peak signal 1320 is generated in points 1330 where phase inversion occurs in the tag signal.

The peak extractor 820 may extract peak positions 1340 of the peak signal 1320 generated by the peak signal generator 810. An operation algorithm of the peak extractor 820 will be described in detail in FIG. 10.

The basis signal generator 830 may generate a subcarrier-removed basis signal 1350 using peak information extracted by the peak extractor 820. According to the structure of the reader of the present invention, the basis signal generator 830 may generate the peak signal using the matching filters to remove DC-offset noises 1410. Moreover, the reader may successively demodulate a tag signal with intensity remarkably reduced due to inter-tag magnetic coupling interference in the radio-wave environment.

Figure 10:
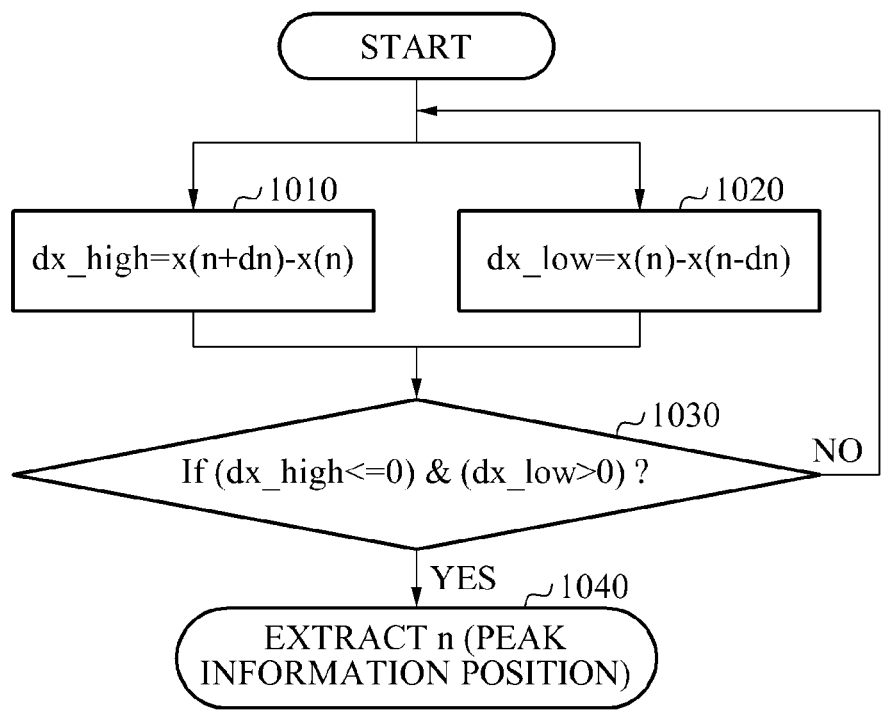
FIG. 10 illustrates an algorithm for extracting a peak position from an output peak signal according to an exemplary embodiment of the present invention.

FIG. 10 illustrates an algorithm for extracting the peak positions 1340 from the output peak signal 1320 according to an exemplary embodiment of the present invention.

The peak positions 1340 may be extracted by the peak extractor 820. In the present invention, the peak positions 1340 may be extracted by a method of detecting a point where a slope of the peak signal 1320 changes from positive to negative. However, alternative methods may be also used.

The algorithm for extracting the peak positions 1340 may detect the peak positions 1340 at x(n) points of the received peak signal 1320. The algorithm may compare a current value and a previous value of the peak signal 1320, thereby detecting a peak point. Meanwhile, the algorithm for detecting the peak positions 1340 may extract a peak position n when a peak occurrence condition, i.e., a point where the slope changes from positive to negative, is satisfied using dx_high and dx_low. $dx\_high = x(n+dn) - x(n)$ in operation 1010 and $dx\_low = x(n) - x(n-dn)$ in operation 1020.

Here, $dn = 1, 2, 3, \ldots$, wherein $dn = 1$ means a preceding sample value and $dn = 2$ means a sample value of a sample that is two samples before a current sample. When $dx\_high \leq 0$ and $dx\_low > 0$ are satisfied in operation 1030, a peak position may be extracted in operation 1040. If these two conditions are not satisfied, a process of comparing the current value and the preceding value may be repeated.

Meanwhile, even though the peak signal includes a local peak noise signal, the dn value is set to a sample value higher than 1, thereby avoiding local peak noises.

Figure 11:
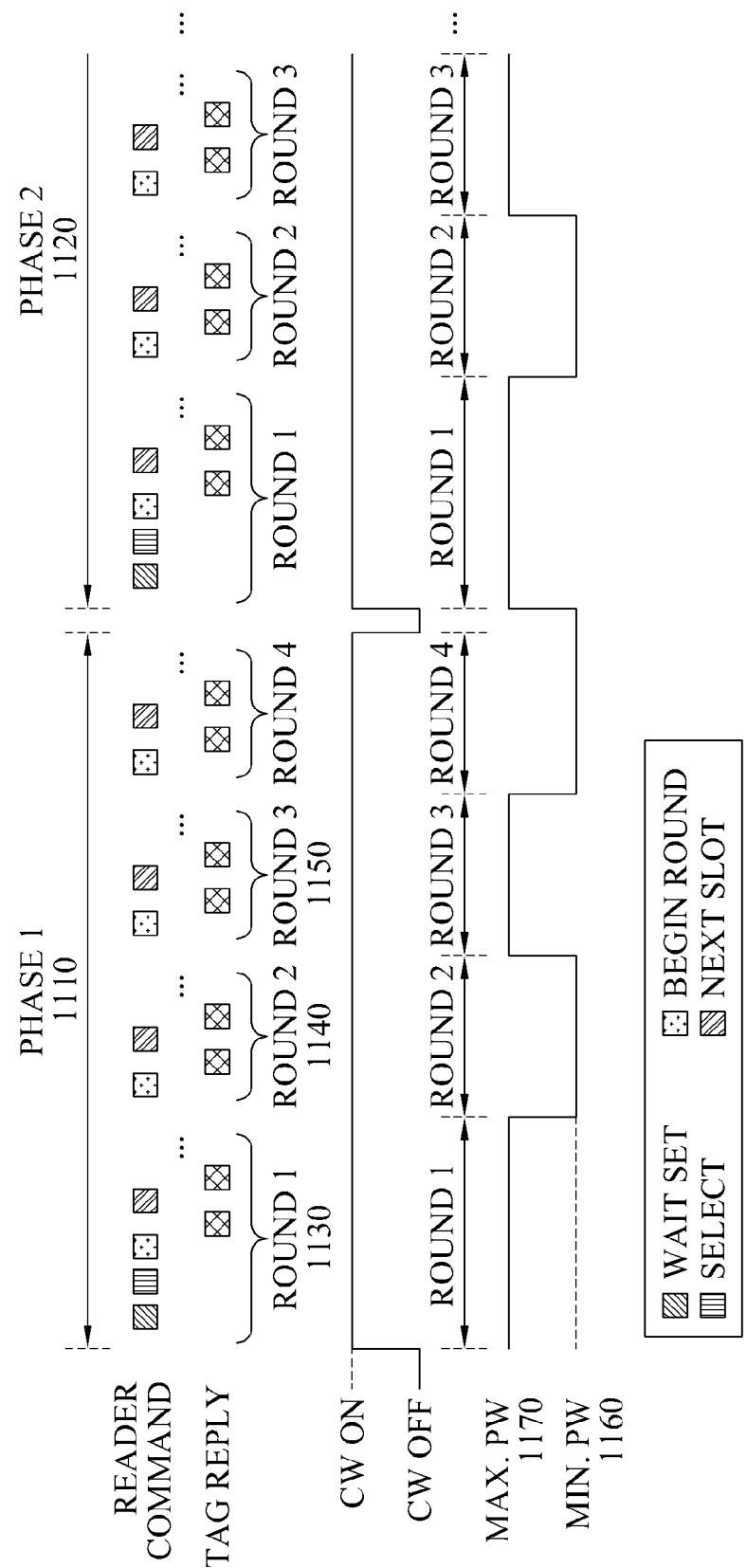
FIG. 11 illustrates operations of a carrier transmission controller and a transmission output level controller according to an inventory protocol procedure.

FIG. 11 illustrates operations of the carrier transmission controller 635 and the transmission output level controller 636 according to an inventory protocol procedure.

In order that the reader identifies a plurality of tags with the wait mode and the sleep mode added in tag-reader inventory communications, the carrier transmission controller 635 and the transmission output level controller 636 may operate according to the inventory protocol procedure.

As shown in FIG. 11, a tag-reader inventory protocol procedure for the reader to obtain a tag ID may include a plurality of phases, such as Phase 1 1110 and Phase 2 1120. Each phase may include a plurality of rounds, such as Round 1, Round 2 and Round 3.

Each round may include a time period for which the Select or BeginRound command is transmitted to obtain a tag ID, as specified in the HF Gen2 standard, and be formed of time periods for a series of reader commands, such as NextSlot, and tag responses.

In the present invention, tags may participate in an initial round in random delay time. In the round, the tags may transmit own $ID_S$ to the reader via exchanges of a series of commands and responses with the reader and transition to the sleep mode. Thus, interference affecting other tags operating in the same or different round may be minimized Further, a relevant control signal may be transmitted to the power amplifier 611a of the analog circuit unit 610 so as to adjust at least two transmission output levels using a control signal to adjust a transmission output level output in each round.

Meanwhile, when there is no more response after performing a plurality of rounds of FIG. 11, the reader may switch off a carrier wave being on and then switch on again. When the carrier wave is switched on, all tags in the sleep mode may be woken up and transition to the wait mode based on tag state transition of FIG. 3. Subsequently, the reader may communicate again with the tags in a new phase in the random delay time.

Meanwhile, the transmission output level controller 636 may output a control signal to adjust at least two transmission output levels to the power amplifier 611a of the analog circuit unit 610.

Thus, the power amplifier 611a may adjust at least two transmission output levels according to the control signal.

FIG. 11 illustrates that a transmission output level switches between two transmission output levels Min. PW 1160 and Max. PW 1170. Here, MM. PW 1160 means a minimum level in a transmission output level range of the reader and Max. PW 1170 means a maximum level. That is, the transmission output level controller 636 controls the transmission output level, iteratively alternately switching from the maximum level to the minimum level, and back to the maximum level in each round, as shown in FIG. 11.

Although the output level operation of FIG. 11 according to the present embodiment switches between two minimum and maximum transmission output levels, a plurality of transmission output levels more than two may be set for a switching operation depending on environments and purposes.

When a plurality of tags is concentrated or stacked in near-field communications using magnetic coupling, over-coupling with a tag relatively adjacent to a reader antenna may occur. A switching operation using two or more transmission output levels in each round may adjust an output power, while switching to a relatively low output level. Thus, coupling with the tag relatively adjacent to the reader antenna may be readily overcome.

In reader-tag communications, the carrier transmission controller 635 may switch on and off a carrier wave in each phase. On the other hand, the transmission output level controller 636 may switch transmission output between two or more output levels in each round of a phase.

Figure 12:
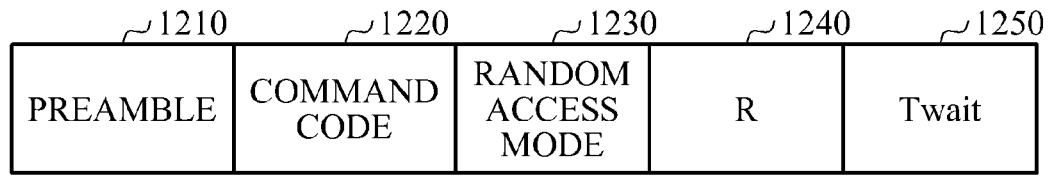
FIG. 12 illustrates a configuration of a WaitSet reader command.

FIG. 12 illustrates a configuration of a WaitSet reader command.

In the initial round of each phase, for example, Round 1 of FIG. 11, a tag in the ready mode may receive the WaitSet reader command of FIG. 12. When the WaitSet reader command is received, the tag may select one of the two random access modes for transition from the wait mode to the ready mode. The internal parameter R and the preset waiting time Twait of the wait mode controller 224a relevant to the selected mode may be changed. Here, to select the second random access mode, R may be fixed to 1 since the second random access mode selects one of 0 and 1 as a random sequence value S.

The WaitSet reader command of FIG. 12 may include a preamble 1210 and a command code 1220 in accordance with a reserved command format defined in the HF Gen2 standard. Further, the WaitSet reader command may include a random access mode selection field 1230, an internal parameter R setting field 1240, and a preset waiting time Twait setting field 1250.

The preamble 1210 may include a frame-sync or a preamble form defined in the HF Gen2 standard.

The command code 1220 may use one of reserved command codes defined in the HF Gen2 standard. Further, although the WaitSet reader command of FIG. 12 according to the present embodiment does not include a CRC field, the CRC field defined in the HF Gen2 standard may be further added.

The reader may set up the internal parameter R and the preset waiting time Twait through the internal parameter R setting field 1240 and the preset waiting time Twait setting field 1250. The tag may select the random sequence value S based on the internal parameter R and the preset waiting time Twait and determine a random access mode.

Hereinafter, operations of selecting a random access mode and changing a tag internal parameter R and a preset waiting time Twait for massive identification according to the present embodiment will be described in detail with reference to FIGS. 3, 11 and 12.

When the reader switches on the carrier wave, the tags may wait for t_ready time in the ready mode. The tags may wait for the BeginRound reader command to report start of a round or other reader commands relevant to an inventory in the waiting time. Further, the tags may wait for the WaitSet reader command to select the random access mode and to change the internal parameter R and the preset waiting time Twait.

As shown in FIG. 3, when the reader commands needed for the round are not received for the t_ready time, the tags may transition back to the wait mode. When the tags in the ready mode receive the WaitSet reader command within the t_ready time, the wait mode controller 224a of FIG. 2 may change the random access mode, the internal parameter R and the preset waiting time Twait to values set in the WaitSet reader command.

When the reader commands needed for the round are not received for the t_ready time, the tags may transition back to the wait mode. Here, the tag having transitioned to the wait mode may transition to the ready mode after a random delay time using a new random access mode, a new internal parameter R, a new preset waiting time Twait.

Thus, the reader may provide the carrier wave and iteratively transmit the WaitSet reader command for a longer time than the t_ready time before conducting communications with the tags in the initial round. Then, the tags may transition alternately to the wait mode and the ready mode, instead of performing inventory communications with the reader based on a state of FIG. 3 by responding using internally predefined initial values.

Further, the tags may change the internal parameter R and the preset waiting time Twait to new user-desired values before inventory communications with the reader and enable inventory communications with the reader. Subsequently, the reader may transmit the reader commands needed for the round to the tags, thereby obtaining tag IDs.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, to process, and create data in response to execution of the software.

For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, and optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

According to example embodiments of the present invention, a system for simultaneously identifying a plurality of HF tags may adopt configurations for on/off control of a carrier wave, control of a transmission output level and control of operations of a wait mode and a sleep mode, and employ a subcarrier digital demodulation unit, thereby simultaneously identifying a plurality of stacked tags at a high speed as compared with a conventional HF RFID system based on an ASK mode.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A high-frequency (HF) tag comprising:
an analog circuit unit to communicate with a reader through an analog signal and to receive energy via magnetic coupling with a reader; and
a digital circuit unit to be supplied with power from the analog circuit unit,
wherein the digital circuit unit supports a sleep mode for the tag to stand by in a low power state after transmitting an identifier (ID) to the reader and a wait mode for controlling random access to the reader;
wherein the digital circuit unit comprises:
an encoder to encode a reply message to a reader command;
a decoder to receive an input of the reader command from the analog circuit unit and to extract information;

a protocol processing unit to process inventory and access protocols;

a tag state controller to comprise a wait mode controller, a sleep mode controller, and a tag state transition unit; and a memory to store the ID; and wherein the sleep mode controller controls the tag to transition to the sleep mode when a reader command needed for the inventory protocol is received in an acknowledged mode and the wait mode controller controls the tag in the sleep mode to transition to the wait mode using a carrier wave.

2. The HF tag of claim 1, wherein the analog circuit unit comprises:

a transmission unit to receive an input of an encoded signal from the digital circuit unit and to transmit the encoded signal to the reader via amplitude-shift keying (ASK) modulation using load modulation;

a rectifier and power supply unit to receive a carrier wave transmitted from the reader and to generate own power;

an initialization unit to initialize an internal operation of the tag in the wait mode of the tag; and a reception unit to receive a command transmitted from the reader and to conduct ASK demodulation.

3. The HF tag of claim 1, wherein the sleep mode controller blocks supply of power and a clock to all blocks, excluding the rectifier and power source unit and the initialization unit, in the sleep mode.

4. The HF tag of claim 1, wherein the wait mode controller initializes all operations of the tag using a reset signal in the wait mode.

5. The HF tag of claim 1, wherein:

the wait mode controller controls a first random access mode and a second random access mode using an internal parameter and a preset waiting time, and the internal parameter and the preset waiting time are changed using a reserved reader command.

6. The HF tag of claim 5, wherein the wait mode controller generates a random sequence based on the internal parameter in the first random access mode, selects any one random value from the generated random sequence, and controls the tag to transition to a ready mode after discounting the random value to 0.

7. The HF tag of claim 5, wherein the wait mode controller randomly selects one of 0 and 1 with the internal parameter fixed to 1, controls the tag to transition to a ready mode when 0 is selected, and reselects one of 0 and 1 after a wait for the preset waiting time when 1 is selected in the second random access mode.

8. The HF tag of claim 5, wherein the tag in a ready mode increases an error count by one when the reader command is not received for the preset waiting time or when a valid reader command is not received even after a plurality of rounds, and controls a tag state so as to transition to the wait mode when the error count is a preset value or higher.

* * * * *